United States Patent [19]
Rudge et al.

[11] Patent Number: 5,527,640
[45] Date of Patent: Jun. 18, 1996

[54] ELECTROCHEMICAL SUPERCAPACITORS

[75] Inventors: Andrew J. Rudge, Los Alamos, N.M.;
John P. Ferraris, Dallas, Tex.;
Shimshon Gottesfeld, Los Alamos, N.M.

[73] Assignee: The Regents of the University of California, Office of Technology Transfer, Alameda, Calif.

[21] Appl. No.: 306,214

[22] Filed: Sep. 14, 1994

Related U.S. Application Data

[63] Continuation-in-part of Ser. No. 981,450, Nov. 25, 1992, abandoned.

[51] Int. Cl.[6] ............................ H01M 10/40; H01M 4/60
[52] U.S. Cl. ............................................ 429/213; 429/194
[58] Field of Search ............................................. 429/213

[56] References Cited

U.S. PATENT DOCUMENTS

| | | | |
|---|---|---|---|
| 4,505,842 | 3/1985 | Kurkov et al. | 429/213 |
| 4,804,594 | 2/1989 | Jow et al. | 429/194 |
| 4,987,042 | 1/1991 | Jonas et al. | 429/213 |
| 5,188,768 | 2/1993 | Sotomura | 429/213 |

FOREIGN PATENT DOCUMENTS

| | | | |
|---|---|---|---|
| 0185941 | 7/1986 | European Pat. Off. | |
| 0303112 | 2/1989 | European Pat. Off. | |
| 0264050 | 12/1985 | Japan | 429/213 |

OTHER PUBLICATIONS

A. F. Burke, "Ultracapacitor Technology for electric Vehicle Applications," Preprints of the Annual automotive Technology Development contractors Coordination Meeting, vol. II, U.S. Department of Energy (1991).

I. D. Raistrick, "Electrochemical Capacitors," published in *Electrochemistry of Semiconductors and Electronics–Processes and Devices*, Ed. J. McHardy and F. Ludwig, Noyes, New Jersey (1992).

B. E. Conway, "Transition from 'Supercapacitor' to 'Battery' Behavior in Electrochemical Energy Storage," 138 J. Electrochem. Soc., No. 6, pp. 1539–1548 (Jun. 1991).

D. Naegele, "Polypyrrole Supercapacitors," *Electronic Properties of Conjugated Polymers III*, Ed. H. Kuzmany et al., Springer–Verlag Berlin, Heidleberg, pp. 428–431 (1989).

D. MacInnes, Jr. et al., "Organic Batteries: Reversible n- and p–Type Electrochemical Doping of Polyacetylene, $(CH_x)$," J. Chem. Soc. Chem. Commun. pp. 317–319 (1981).

Y. Kobayashi et al., "$(CH)_x/(CH)_x$ Battery with Unsymmetrical Tetraalkyl Ammonium Salt," 18 Synthetic Metals, pp. 619–624 (1987).

K. Rousseau et al., "Tetraalkylammonium Trifluoromethane–sulfonates as Supporting Electrolytes," 37 J. Org. Chem., No. 24, pp. 3968–3971 (1972).

Herbert O. House et al, "A Comparison of Various Tetraalkylammonium Salts as Supporting Electrolytes in Organic Electrochemical Reactions," 36 J. Org. Chem., No. 16, pp. 2371–2375 (1971).

Donald T. Sayer et al., "Solvents and Electrolytes," published in *Experimental Electrochemistry for Chemists*, Wiley–Interscience Publication, John Wiley & Sons, New York, London, Sydney, and Toronto (1974).

*Primary Examiner*—David B. Springer
*Attorney, Agent, or Firm*—Ray G. Wilson

[57] ABSTRACT

A new class of electrochemical capacitors provides in its charged state a positive electrode including an active material of a p-doped material and a negative electrode including an active material of an n-doped conducting polymer, where the p-doped and n-doped materials are separated by an electrolyte. In a preferred embodiment, the positive and negative electrode active materials are selected from conducting polymers consisting of polythiophene, polymers having an aryl group attached in the 3-position, polymers having aryl and alkyl groups independently attached in the 3- and 4-positions, and polymers synthesized from bridged dimers having polythiophene as the backbone. A preferred electrolyte is a tetraalykyl ammonium salt, such as tetramethylammonium trifluoromethane sulphonate (TMATFMS), that provides small ions that are mobile through the active material, is soluble in acetonitrile, and can be used in a variety of capacitor configurations.

9 Claims, 9 Drawing Sheets

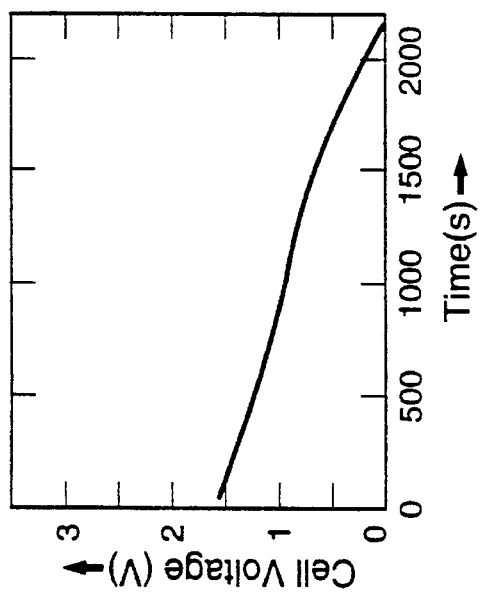
Fig. 6C
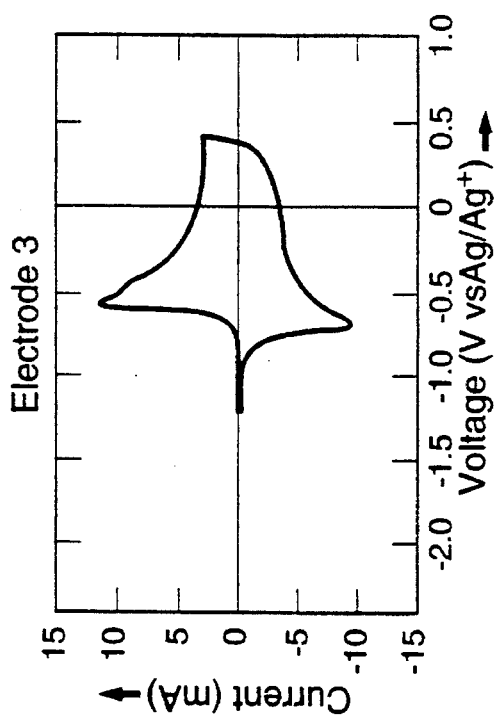
Fig. 6A  Electrode 3
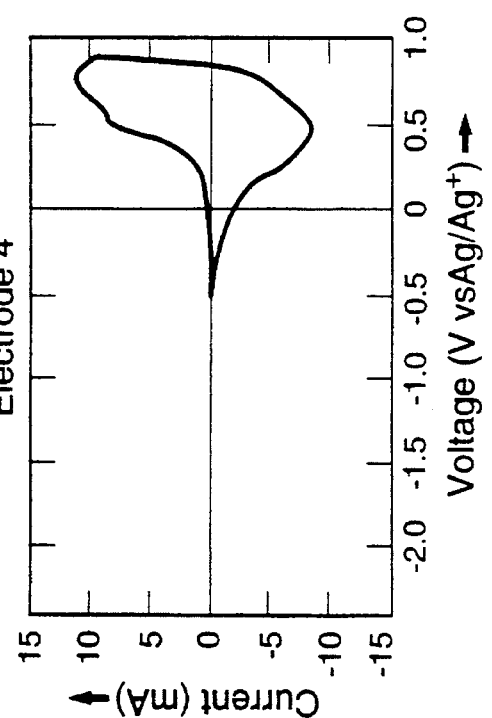
Fig. 6B  Electrode 4

ELECTROCHEMICAL SUPERCAPACITORS

This application is a continuation-in-part of application Ser. No. 07/981,450, filed Nov. 25, 1992, now abandoned.

BACKGROUND OF INVENTION

This invention relates to energy storage devices and, more particularly, to supercapacitors using conducting polymers for charge storage. This invention is the result of a contract with the Department of Energy (Contract No. W-7405-ENG-36).

A promising application of conducting polymers is in energy storage devices. Battery systems have been extensively studied where a p-dopable conducting polymer is used as the cathode active material and a metal, often lithium, is used as the anode active material. Various p-dopable materials have been studied: polyacetylene, poly-(p-phenylene), polypyrrole, polyaniline, etc. A battery with n-dopable conducting polymer, polyacetylene, as the anode material and a metal oxide as cathode active material has also been described.

The nature of charge storage within conducting polymers is complex and has been treated as being a mixture of Faradaic (battery type) and capacitive (not battery type) components. The electrode potential during the discharge of a battery electrode is expected to remain ideally constant and hence the cell voltage of a battery remains fixed until it goes abruptly to zero when the relevant chemicals are consumed. On the other hand, the potential at an electrode when a capacitive reaction takes place ideally changes linearly with charge, in exactly the same way as the voltage across a regular capacitor, by $Q=CV$.

In general, this is the type of behavior observed in the discharge of doped conducting polymers. The reason for observed capacitive behavior in electrochemical systems is precisely that a capacitor is formed at an electrode/electrolyte interface by electronic charging of the solid electrode material (e.g., a metal or carbon) with counter-ions in the solution phase migrating to the electrode in order to balance that charge. To some degree, this is what occurs in conducting polymer electrodes, but the charging process occurs through the volume of the active polymer material rather than just at the interface. When the conducting polymer is being p-doped, electrons leave the polymer backbone, generating an excess of positive charge. To counter this charge, anions from the electrolyte solution migrate through the film and position themselves adjacent to the positively charged polymeric units. In the case of n-doping of conducting polymers, the reverse process takes place in that the polymer backbone becomes negatively charged by the addition of electrons from the external circuit and cations enter the film from the solution to balance this charge.

In a typical electrochemical capacitor, the distance that separates the charges is nominally in the order of angstroms and the capacitances that can be obtained are orders of magnitude higher than in conventional capacitors, including electrolytic capacitors. The advantage of electrochemical capacitors over batteries is, that while typical energy densities are lower, the available power densities are much higher. The reason for this is that no phase transformation takes place when a capacitive electrode is charged or discharged, only the movement of electronic charge through the solid electrode phase and ionic movement through the solution phase. In a typical battery reaction, metal dissolution, for example, there are constraints on the maximum rate of the electrochemical reaction, and, hence, power density, that are associated with the requirement for phase transformation.

It has been suggested that possible applications for electrochemical capacitors include energy sources for computer memory back-up and high power sources for electric vehicles. Capacitor configurations using conducting polymers have been previously discussed where the two electrodes contain equal amounts of the same p-dopable conducting polymer (a Type I configuration as herein discussed) or one electrode is a p-dopable conducting polymer electrode and the other is a high surface area carbon electrode.

The present invention will consider three types of electrode configurations forming a unit cell in a capacitor:

Type I—both electrodes contain the same amount of the same p-dopable conducting polymer;

Type II—two different p-dopable conducting polymers form the electrodes, where the voltage range over which one of the conducting polymers is oxidized from neutral to p-doped is substantially different from the range for the other polymer;

Type III—each conducting polymer is in its conducting doped state when the capacitor is fully charged, one n-doped and one p-doped. Prior art capacitors have been limited to Type I configurations. Prior art batteries have been reported with Type II and Type III configurations. Type III batteries require a polymer than can be both n-doped and p-doped, such as polyacetylene, poly-(p-phenylene), and polythiophene and derivatives. It is difficult to n-dope polythiophene and prior art Type III batteries have used polyacetylene and poly-(p-phenylene) electrodes in a symmetric configuration and polyacetylene/polypyrrole in an unsymmetric configuration. Only low power applications, e.g., batteries, have been considered, however, because unfavorable material properties of the active conducting polymers preclude high power applications.

It would be desirable to provide high energy density capacitors using conducting polymers. However, such devices are preferably formed of polymers that can be formed in a relatively thick layer for high volume energy storage. Ion transport through the polymer must be rapid to provide a high output power. The present invention is directed to these characteristics and it is an object of the present invention to provide a supercapacitor, i.e., a high output energy capacitor using conducting polymers.

It is another object of the present invention to provide an electrolyte that enables rapid ion transport through the active conducting polymer film.

One other object of the present invention is to maximize the stored energy that can be delivered from a capacitor.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a capacitor having in its charged state a positive electrode and a negative electrode with an electrolyte therebetween, where the positive electrode includes an active material of a p-doped conducting polymer and the negative electrode includes an active material of a n-doped conducting polymer. In a preferred embodiment the positive and negative electrode active materials are selected from conducting polymers consisting of polythiophene, polymers of thiophene derivitized in the 3-position, polymers having an aryl group attached to thiophene in the 3-position, polymers having aryl and alkyl groups independently attached to thiophene in the 3- and 4-positions, and polymers synthesized from bridged dimers having polythiophene as the backbone. In another embodiment, a preferred electrolyte is a tetraalkyl ammonium salt, such as tetramethylammonium trifluoromethane sulphonate (TMATFMS), that provides small cations that are mobile through the active material, is soluble in acetonitrile, and can be used in Type I, II, and III capacitor configurations.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 6A, 6B, and 6C graphically depict the actual performance of a Type II capacitor.

DETAILED DESCRIPTION OF INVENTION

In accordance with the present invention, a capacitor is provided with a Type III electrode configuration in symmetric arrangement with a conducting polymer selected from polythiophene, polymers of thiophene derivatized in the 3-position, and other polymers having polythiophene as the backbone. An electrolyte in a non-aqueous solution is disposed between the capacitor electrodes. The purpose of the electrolyte is to provide a conducting medium between the electrodes and any inert electrolyte salt that can be used in a non-aqueous solvent will support the charge transfer characteristics discussed herein. However, the choice of electrolyte can influence the performance of the electrodes. In a preferred embodiment, an electrolyte is formed from a tetraalkylammonium salt that is highly soluble in acetonitrile, is stable over a high voltage range, and has small mobile cations for n-doping conducting polymers. The preferred electrolyte that satisfies these criteria is tetramethylammonium trifluoromethanesulphonate (TMATFMS) $(CH_3)_4NCF_3SO_3$. This electrolyte is shown to be suitable for Types I, II, and III capacitors.

Figure 1A:
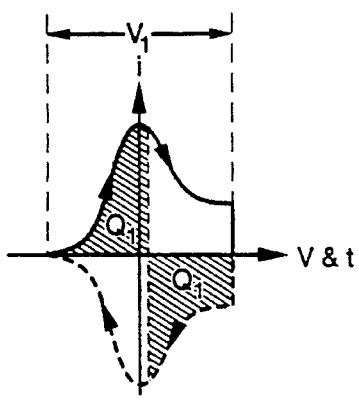
FIGS. 1A and 1B graphically depict the expected qualitative performance of a Type I capacitor.
Figure 1B:
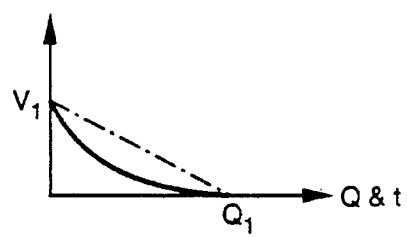
Figure 2A:
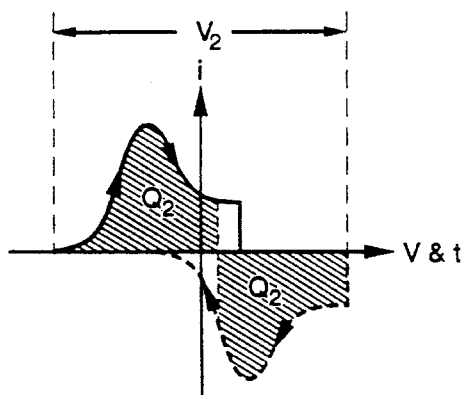
FIGS. 2A and 2B graphically depict the expected qualitative performance of a Type II capacitor.
Figure 2B:
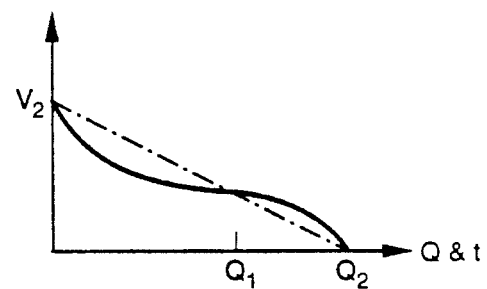
Figure 3A:
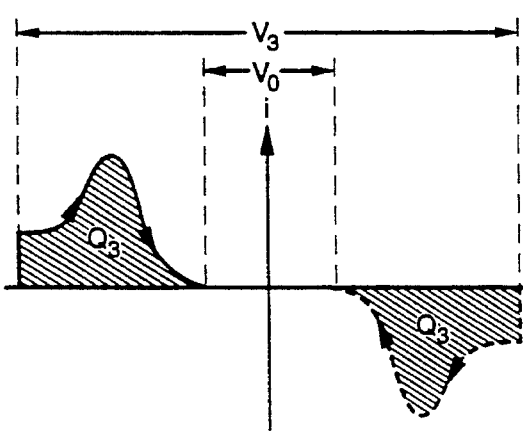
FIGS. 3A and 3B graphically depict the expected qualitative performance of a Type III capacitor.

The performance of Type I, II, and III capacitors can be understood by reference to FIGS. 1A, 1B, 2A, 2B, 3A, and 3B. FIGS. 1A, 2A, and 3A are voltammograms where the shaded areas correspond to the discharge of each electrode. In a voltammogram, the current drawn from an electrode is measured while the voltage at that electrode (measured against a fixed potential reference electrode) is scanned between selected limits. A positive current corresponds to an oxidation reaction and a negative current refers to a reduction reaction. The voltammogram provides information on how much charge can be accessed from a capacitor electrode and over what range the potential at each electrode will vary as the capacitor is discharged.

Figure 3B:
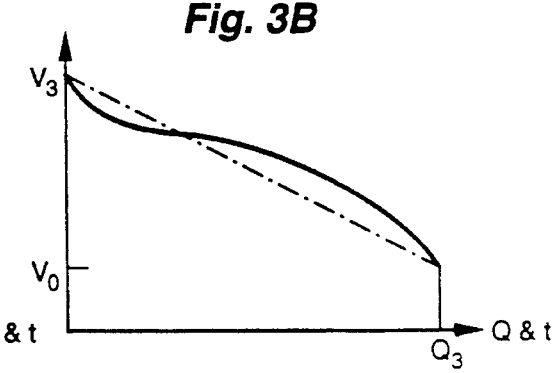

FIGS. 1B, 2B, and 3B show the performance of a capacitor made with two electrodes of the indicated type, presented as a plot of cell voltage as a function of charge and time as the capacitor is discharged at constant current. The most important parameter illustrated from these plots is the energy content of the capacitor, as given by the area under the curve, i.e., $E=\int VdQ$. The energy of the capacitor scales according to the square of the voltage, $V_1$, $V_2$, and $V_3$. An ideal discharge plot is shown as a dashed line, while the solid line represents the performance from active materials with the voltammograms shown in FIGS. 1A, 2A, and 3A.

Referring now to FIG. 1A, the performance of a Type 1 capacitor (same amount of the same p-dopable conducting polymer at each electrode) is shown. The voltammogram shows the variation of current with electrode potential that occurs at each electrode when the capacitor is discharged. When the capacitor is charged, one electrode is in the neutral state (left hand side of voltammogram) while the other is in the fully p-doped state (right hand side) and the cell voltage is $V_1$ (typically 1 V). When the capacitor is discharged, the neutral electrode oxidizes (full curve) and the p-doped electrode reduces (dashed curve) until the cell voltage reaches zero, at which point each electrode is half p-doped. The charge drawn from the capacitor is $Q_1$. The discharge characteristic of a typical Type I capacitor is shown in FIG. 1B with the energy content limited by the ability to access only one half of the doping charge at zero cell voltage.

A Type II capacitor (two different p-dopable conducting polymers) is shown in FIG. 2A. The voltage range over which one of the conducting polymers is oxidized from neutral to p-doped is substantially different from the range of the other polymer. From this effect, the initial cell voltage is extended to $V_2$ (typically 1.5 V). Because the two charging domains are staggered, the amount of charge that can be obtained during discharge is enhanced to $Q_2$, relative to Type I (FIG. 1A). The improvement in available energy density from Type I to Type II is apparent from the increase in area under the capacitor discharge curve, FIG. 2B.

In accordance with the present invention, a significant increase in performance is obtained with a Type III capacitor where one polymer electrode is fully n-doped and the other polymer electrode is fully p-doped when the capacitor is fully charged. The voltage of the fully charged capacitor is typically 2–3 V. FIG. 3A graphically shows a voltammogram of the capacitor charge/discharge cycle. The full doping charge, $Q_3$, is released during discharge in this configuration and, when the capacitor is fully discharged, both electrodes are in the undoped state. Since there is no residual charge stored by the polymer electrodes in the undoped region, the cell voltage drops normally until discharge voltage $V_o$ is reached and then rapidly drops to zero volts as shown in FIG. 3B.

The Type III capacitor has a particular advantage over Types I and II. When a Type III capacitor is charged, the conducting polymer on both electrodes is in a doped and highly conducting state. In Type I and II capacitors, one electrode is always in the neutral, insulating state when the capacitor is charged. The presence of an insulating film when discharge commences will lead to a much lower initial power density from such devices, relative to a condition where both electrodes start to discharge from a conducting state. This is particularly important to applications such as an electric vehicle where a high initial instantaneous power output is required.

A Type III capacitor can be constructed either symmetrically or unsymmetrically. A symmetric device, with the same amount of the same conducting polymer on each electrode, is the preferred embodiment and allows the terminals of the capacitor to be reversed, a possible advantage that may allow continued high performance during continual cycling. The symmetric device may also be easier to fabricate than an unsymmetric device. However, an unsymmetric device may be selected where the choice of electrode material is determined by cost and performance. Then the conducting polymer that exhibits the best and most cost effective n-doping may well not be the most suitable material for p-doping.

Figure 4:
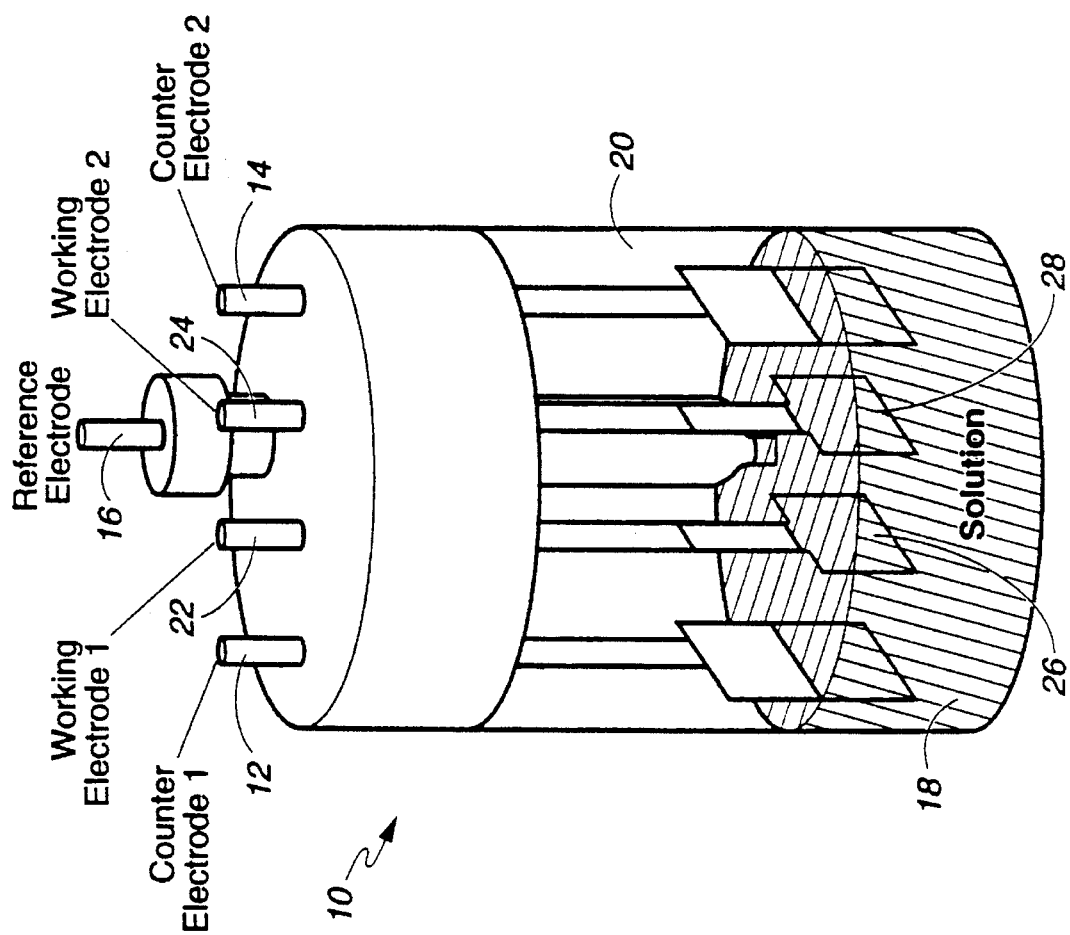
FIG. 4 depicts an experimental arrangement of electrodes in a capacitive configuration.

FIG. 4 illustrates a test capacitor cell 10 for obtaining voltammograms and discharge characteristics for Types I, II, and III capacitors. Counter electrodes 12 and 14 are formed from carbon paper electrodes with a reference electrode 16 as a standard Ag/Ag$^+$ electrode designed for non-aqueous electrochemistry. The working electrodes 22 and 24 are formed from 3 mil thick carbon paper with areas 26 and 28 for polymer formation of about 0.2 cm$^2$.

The electrodes are arranged within container 20 in an electrolyte solution 18. In general, an electrolyte that is sufficiently soluble in a non-aqueous solvent will provide conductivity and support the charge transfer discussed above. But in order to maximize the energy transfer that might be obtained by charging the electrode configuration of the present invention, solution 18 is preferably formed from a solvent/electrolyte that is specific for supercapacitor applications. One well known solvent for obtaining solutions with good ionic conductivity and stability over a wide voltage window is acetonitrile. The selection of an electrolyte is then directed by two considerations: first, the electrolyte must contain sufficiently small cations that are able to travel rapidly through a conducting polymer film during n-doping and dedoping for increased power densities and doping levels; and the electrolyte must be highly soluble in the solvent, here acetonitrile. By "highly soluble" is meant a solubility of at least 1 mol/dm$^3$. The requirement for voltage stability generally requires an electrolyte with a working range over the interval between at least +1 and −2 volts (vs. reference electrode, either SCE or AG/AgCl$^+$). The requirement for rapid ion travel permits the rapid charge/discharge of layers of active conducting polymer material with sufficient charge capacity, i.e., sufficient thickness, to satisfy the energy content requirements for high power applications of electrochemical capacitors. Exemplary values for these requirements of rapid transport and energy content are the complete discharge with a time constant of 10 seconds of an active layer with a charge capacity of 1 Farad/cm$^2$ (cross-sectional area).

A preferred electrolyte for use with the acetonitrile solvent is a tetraalkylammonium salt. A preferred alkyl group is selected from the group consisting of methyl, ethyl, propyl, or butyl. Suitable salts include tetrafluoroborate, hexafluorophosphate, trifluoromethanesulfonate, perchlorate and nitrate. Tetraalkylammonium salt solubility and voltage working range characteristics are widely tabulated so that persons working in the field of electrochemistry can readily locate tetraalkylammonium salts having the required solubility and voltage working range in acetonitrile solvent. Table A lists exemplary salts having suitable characteristics that were readily determined from various literature sources.

TABLE A

| Tetraalkylammonium salt | Voltage Range[1] (volts v. reference) | Solubility g/100 ml of solution (concentration, M) |
| --- | --- | --- |
| Et$_4$NBF$_4$ | 2.3[1] to −2.7[5] | 37 (1.69)[2] |
| Et$_4$NCF$_3$SO$_3$ | 3.0 to −2.5[4] | 50 (1.49)[3] |
| Et$_4$NClO$_4$ | −2.8[4] | 26 (1.13)[2] |
| n-Pr$_4$NBF$_4$ | | 36 (1.32)[3] |
| n-Pr$_4$NCF$_3$SO$_3$ | 3.0 to −2.4[4] | 98 (2.5)[3] |
| n-Bu$_4$NClO$_4$ | 1.5 to −2.77[5] | 70 (2.05)[2] |
| n-Bu$_4$NBF$_4$ | 2.3[5] to −2.74[5] | 71 (2.21)[2] |
| n-Bu$_4$NBr | −2.76[5] | 66 (1.99)[2] |

[1] pg. 188, Sawyer et al., Experimental Electrochemistry for Chemists, John Wiley and Sons, (1974)
[2] pg. 189, id
[3] pg. 3969, 37 J. Org. Chem., No. 24 (1972)
[4] pg. 3970, id
[5] pg. 2372, 36 J. Org. Chem., No. 16 (1971).

While acetonitrile is a preferred solvent because of its high voltage stability, there are still other non-aqueous solvents, e.g., tetrahydrofuran, dimethylformamide, dimethylsulfoxide, and others, that provide the required solubility and voltage stability in combination with various tetraalkylammonium salts. These characteristics are also tabulated in reference texts such as Sawyer, supra., and journal articles such as the J. Org. Chem., supra. An examplary salt of tetraalkylammonium that is highly soluble and has a wide range of voltage stability is tetramethylammonium trifluoromethanesulphonate (TMATFMS) having a chemical formula (CH$_3$)$_4$NCF$_3$SO$_3$. This salt has a small stable cation ((CH$_3$)$_4$N+), good solubility in acetonitrile, and is stable over a wide voltage range.

The TMATFMS salt was prepared by neutralizing tetramethylammonium hydroxide (TMAH-(CH$_3$)$_4$NOH.5H$_2$O) with an equimolar amount of trifluoromethanesulphonic acid (TFMA-HCF$_3$SO$_3$) according to the following procedure. 58 g of TMAH was dissolved in 100 ml deionized water and then cooled with ice from deionized water. While stirring and monitoring the pH, TFMA was added slowly through a dropper until the pH rapidly became acidic when the reaction was complete. The solvent was removed in vacuo to give a white solid that was dried under high vacuum to remove any excess acid. The solid was recrystallized twice from acetone-hexane after hot filtering a solution of the salt in acetone. The solid was dried at 150° C. under vacuum. The resulting white crystalline solid had a melting point of 383°–384° C. and elemental analysis showed good agreement with expected values.

The working solution in all experiments was 1.0M TMATFMS in acetonitrile.

TYPE I CAPACITOR

Figure 5C:
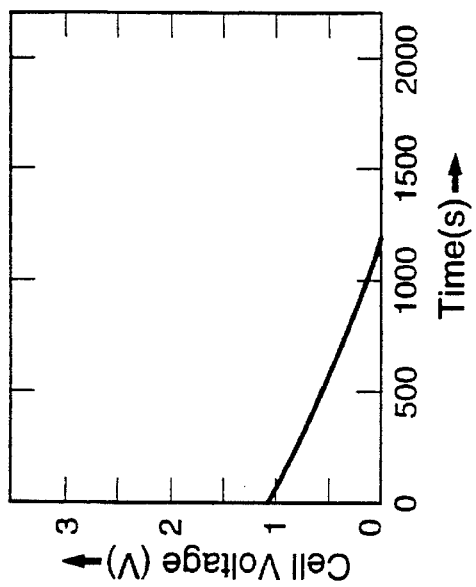
FIGS. 5A, 5B, and 5C graphically depict the actual performance of a Type I capacitor.
Figure 5A:
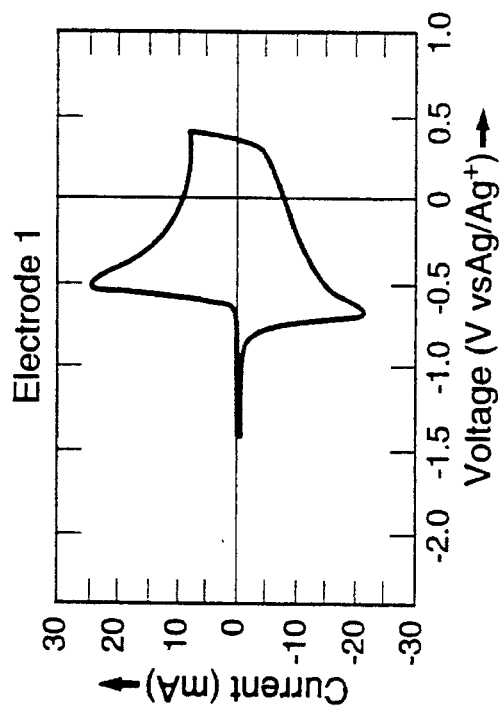
Figure 5B:
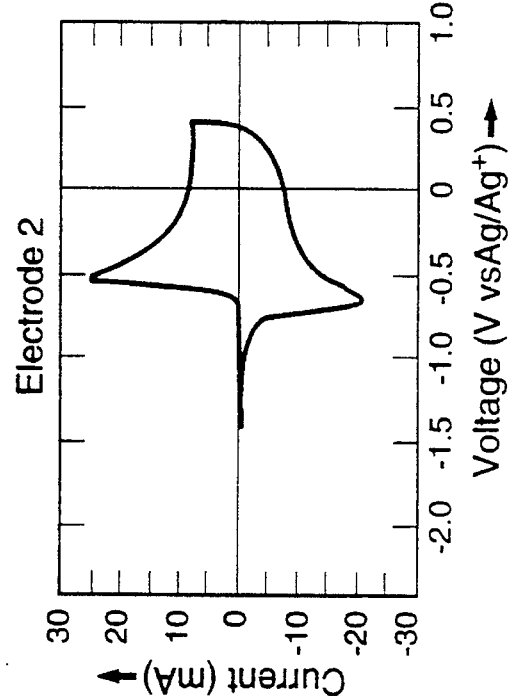

Polypyrrole (PPy) was grown electrochemically by oxidizing pyrrole to form the polymer on electrodes 26 and 28, as shown in FIG. 4. The solution was 0.1M pyrrole and 1M TMATFMS in acetonitrile and the polymer was grown at 1 mA for 4,000 seconds on each electrode. The mass of neutral polymer on each electrode after film growth was 1.38 mg. The electrodes were washed in acetonitrile and transferred to a solution of 1M TMATFMS in acetonitrile. The cyclic voltammogram for each of the electrodes in this solution is shown in FIGS. 5A and 5B to confirm that both films contain similar amounts of polymer.

After the cyclic voltammogram was obtained, one electrode, e.g., electrode 22, was held potentiostatically for about 5 minutes at −1.2 V vs. reference electrode 16, using the corresponding carbon counter electrode 12. This ensured that the polypyrrole was in its undoped insulating form. The other electrode, e.g., electrode 24, was then held for about 2 minutes at +0.4 V so that it would become p-doped. The electrodes were then connected so that a constant discharge current of 200 µA could be passed between the two electrodes and the voltage difference between the two could be measured. The capacitor discharge characteristics are shown in FIG. 5C.

TYPE II CAPACITOR

A capacitor cell was constructed as shown in FIG. 4. A PPy film was grown electrochemically on only one of the electrodes, e.g., electrode 22, as described for the Type I capacitor, to form a mass of PPy of 1.38 mg. Electrode 22 and a second carbon electrode were washed in acetonitrile and transferred to a solution of 0.1M bithiophene and 1M TMATFMS in acetonitrile. A film of polythiophene (PT) was electrochemically grown onto the other working electrode, electrode 24, at 1 mA for 3,000s. The mass of PT deposited on the electrode was 2.40 mg. Bithiophene was selected as the starting material for polymerization because its oxidation potential is lower than that of thiophene and the risk of over-oxidizing the film during growth is minimized. The electrodes were then washed and transferred to a solution of 1M TMATFMS in acetonitrile.

FIGS. 6A and 6B graphically show the cyclic voltammogram for the PPy and PT electrodes, respectively. The voltage separation provided by the two p-doping processes is clearly shown. The capacitor discharge characteristics were obtained as for the Type I capacitor and are shown in FIG. 6C. The improvement in energy delivery over Type I is clearly shown by the increase in area under the discharge curve.

TYPE III CAPACITOR

A film of poly-3-(4-fluorophenyl)-thiophene (PFPT) was grown onto two electrodes 22, 24 in the configuration shown in FIG. 4 by polymerizing from a solution of 0.1M 3-(4-fluorophenyl) thiophene and 1M TMATFMS in acetonitrile at 1 mA for 4,000s for each electrode. A PFPT film of 2.48 mg was generated on each electrode. Cyclic voltammograms for the films of PFPT on each electrode 22, 24 are shown in FIGS. 7A and 7B. Each film of PFPT exhibits both p-doping and n-doping and the figures show that the amount of polymer deposited on each electrode was similar.

Figure 7C:
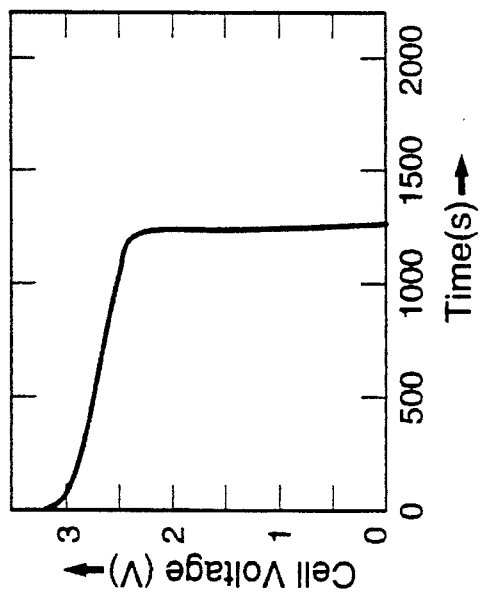
FIGS. 7A, 7B, and 7C graphically depict the actual performance of a Type III capacitor.
Figure 7A:
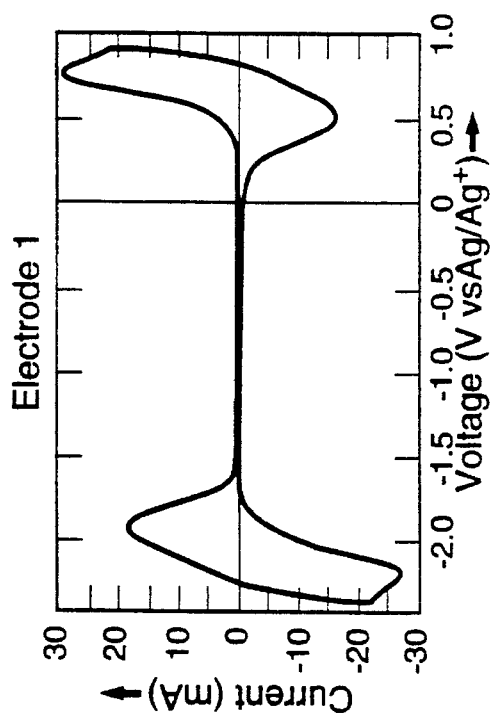
Figure 7B:
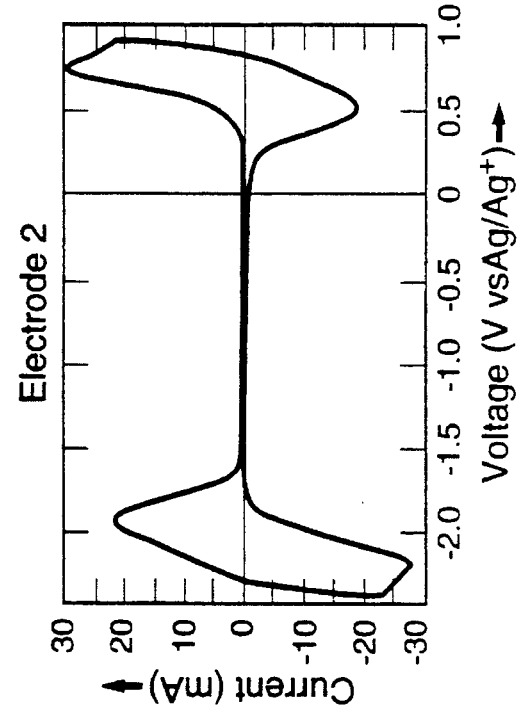

The discharge characteristics of the Type III capacitor is shown in FIG. 7C. When a Type III capacitor is in its discharged state, both electrodes are in their undoped form and both adopt a potential of about −0.8 V to yield a voltage close to zero across the capacitor terminals. The capacitor was charged by passing 200 µA across the cell until the voltage between the electrodes was 3.1 V and the capacitor was discharged at 200 µA. The large energy available from the Type III capacitor is evident from the area under the discharge curve.

A comparison of the performance of capacitor Types I, II, and III is shown in Table B:

TABLE B

|  | Type I | Type II | Type III |
| --- | --- | --- | --- |
| Fully Charged State Voltage V | 1.0 | 1.5 | 3.1 |
| Charge Density |  |  |  |
| Coulombs/cm$^2$ of electrode | 1.18 | 2.21 | 1.28 |
| Coulombs/gm active material | 85.5 | 117 | 51.6 |
| Energy Density |  |  |  |
| Joules/cm$^2$ | 0.564 | 1.89 | 3.49 |
| Joules/gm active material | 40.9 | 100 | 141 |
| Watt hours per kg active material | 11.35 | 27.8 | 39 |

Figure 8A:
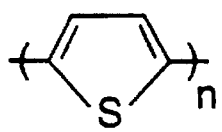
FIG. 8A–8H illustrate structural formulas for exemplary conducting polymers.
Figure 8B:
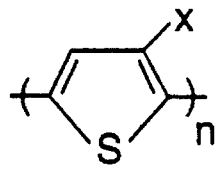
Figure 8C:
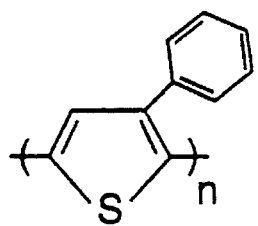
Figure 8D:
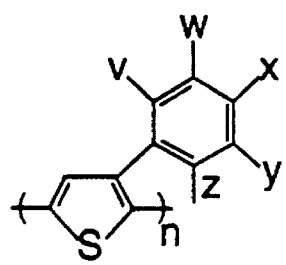
Figure 8E:
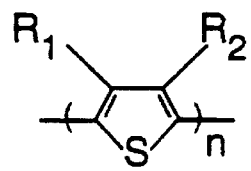
Figure 8F:
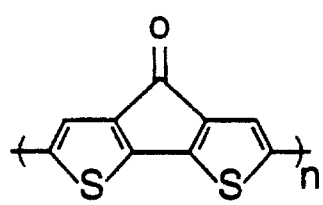
Figure 8G:
Figure 8H:
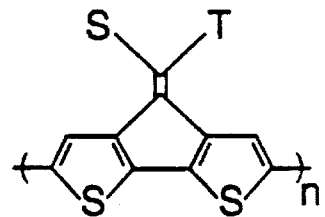

The high energy density available from a Type III capacitor is clearly demonstrated in Table B. While the experimental Type III capacitor was formed with PFPT as the conducting polymer, any conducting polymer that can be both n-doped and p-doped can be used or different polymers can be used where one can be n-doped and one can be p-doped. A preferred conducting polymer has a backbone of polythiophene (FIG. 8A). Suitable polymers thus include all polymers where the thiophene is derivitized in the 3-position (FIG. 8B), e.g., PFPT; polymers where a phenyl (FIG. 8C), substituted phenyl or other aryl group (FIG. 8D where, for PFPT, V, W, Y, and Z=H; X=F), has been attached to the thiophene in the 3-position; polymers where aryl and alkyl groups are independently substituted at the 3 and 4 positions; and polymers where polythiophene is the backbone but the polymer is synthesized from bridged dimers. Examples of bridged dimers are PCDM (FIG. 8G) (poly-4-dicyanomethylene-4H-cyclopenta[2,1-b;3,4-b']) and PCDT (FIG. 8F) (poly-4H-cyclopenta [2,1-b;3,4-b']dithiophen-4-one). Another form of PCDM is shown in FIG. 8H, where S and T are independently —CN, —NO$_2$, -aryl, -aryl-Q, —COX, —SO$_2$R, —H, or -alkyl; X is —OR or —NR$_1$R$_2$; R, R$_1$, and R$_2$ are independently -alkyl,-aryl or —H; Q is h-halide, —NO$_2$, —CN, —SO$_2$R or —COX wherein at least one of the S or T is —NO$_2$, NO$_2$R, —CN, —COX or -aryl-Q.

The Type III capacitor has also been demonstrated for PPT (poly(3-phenylthiophene)) and PCDM. The test apparatus shown in FIG. 4 was formed with electrodes of PPT and PCDM in a solvent/electrolyte of acetonitrile and tetrabutylammonium hexafluorophosphate (TBAPF$_6$). The potential window available from PPT was more than 3 V and more than 2 V from PCDM.

Figure 9:
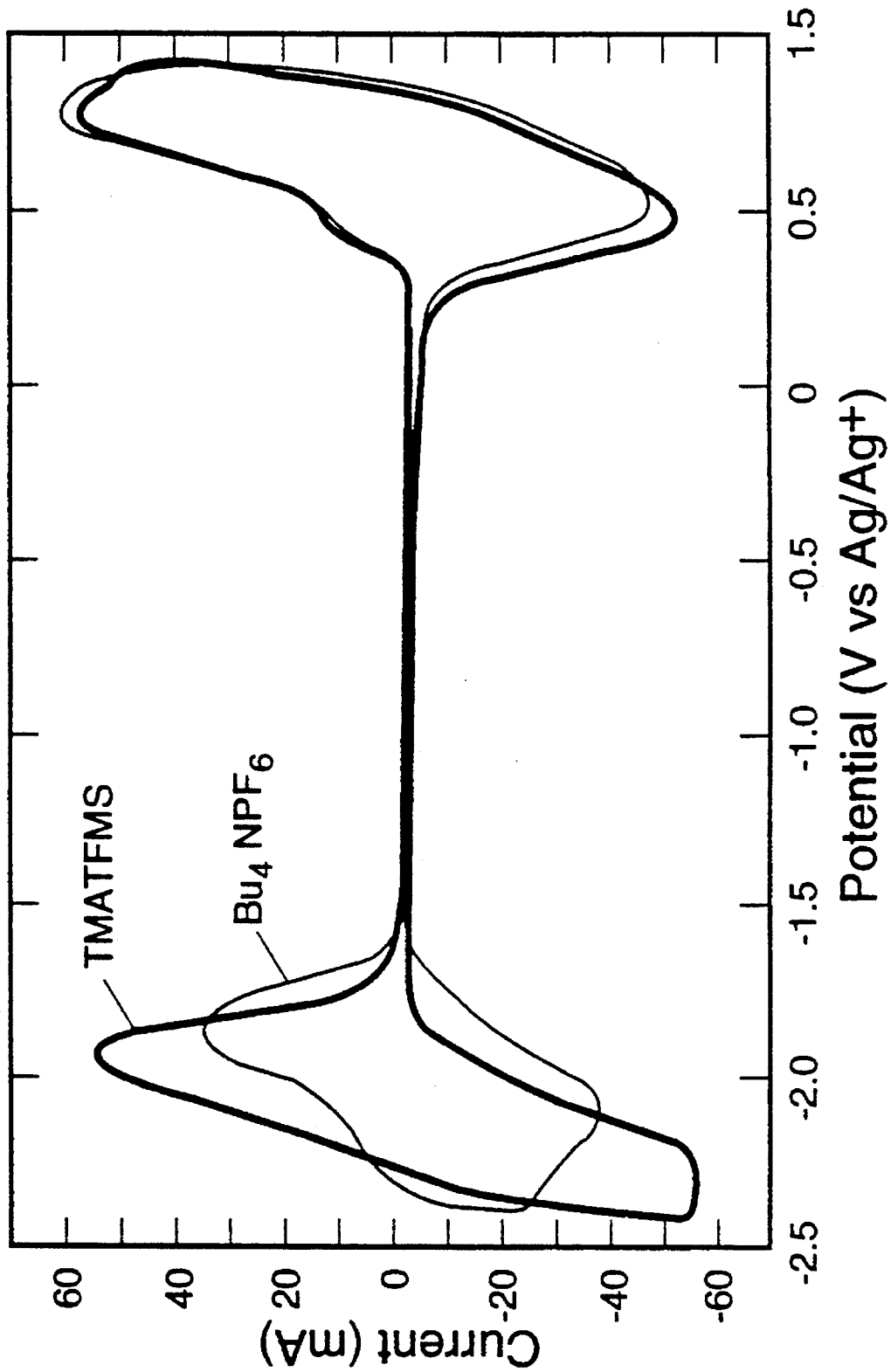
FIG. 9 shows two cyclic voltammograms comparing the reversible p- and n-doping/undoping of a PFPT electrode with a preferred electrolyte salt, TMATFMS, and with tetrabutylammonium hexafluorophosphate ($Bu_4NPF_6$), both salts dissolved in acetonitrile.
Figure 10:
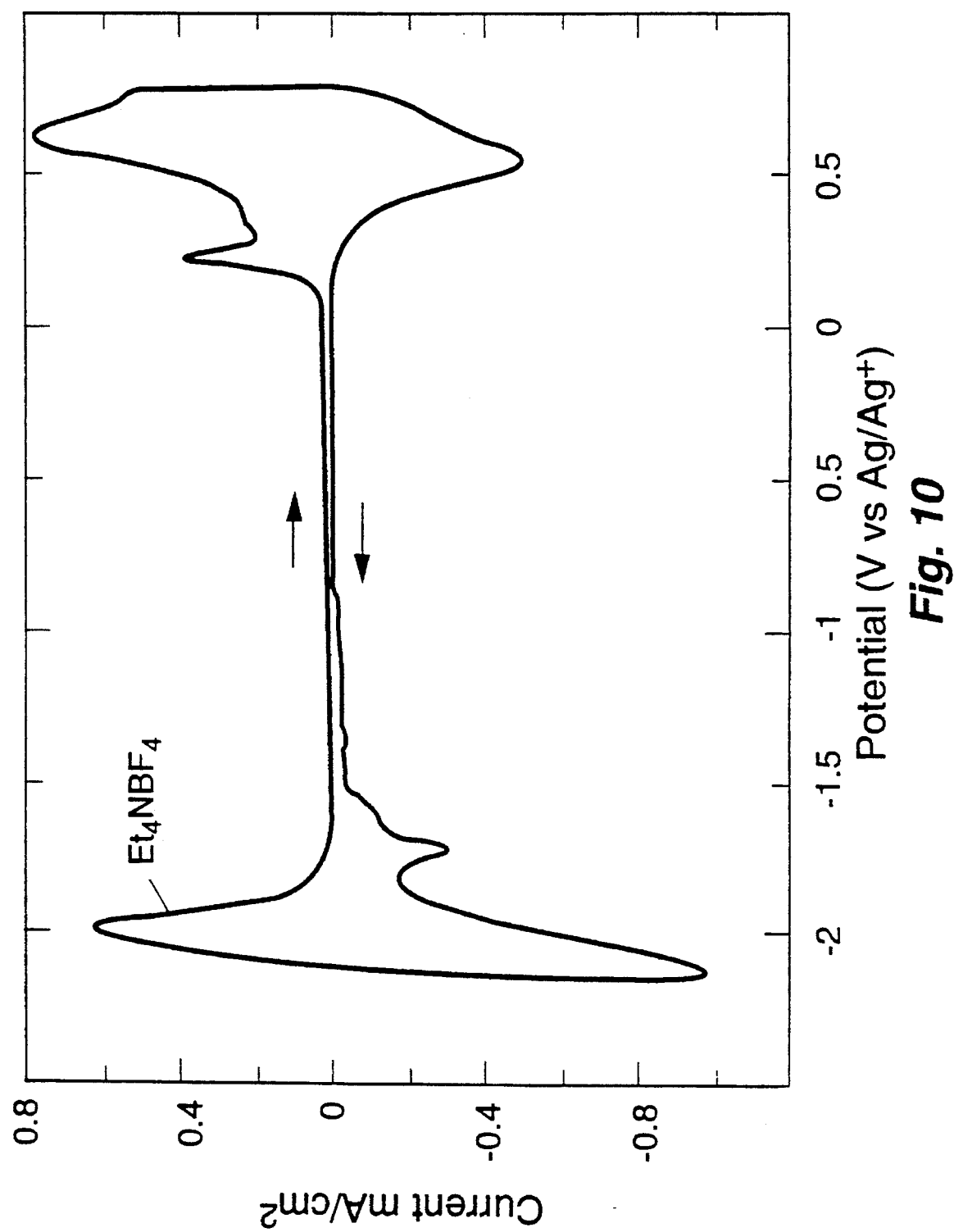
FIG. 10 is a cyclic voltammogram showing the reversible p- and n-doping/undoping of a PFPT electrode with an electrolyte salt of tetraethylammonium tetrafluoroborate ($Et_4NBF_4$) dissolved in acetonitrile.

FIGS. 9 and 10 further show the application of various non-aqueous electrolytes for use with the present invention. FIG. 9 is a comparison between a voltammogram obtained with the preferred salt (TMATFMS) and with tetrabutylammonium hexafluorophosphate (Bu$_4$NPF$_6$), both salts dissolved in acetonitrile. The concentration of each of the salts in the two electrolyte solutions was 1 mol/dm$^3$. The electrodes for the voltammogram were formed from 75 µm thick porous carbon paper with a film of PFPT grown at 2 mA/cm$^2$ for 4000 sec. from an acetonitrile solution of 0.1 mol/dm$^3$ of the monomer (FPT) and 1.0 mol/dm$^3$ of TMATFMS for the TMATFMS example and 1.0 mol/dm$^3$ Bu$_4$NPF$_6$ for the Bu$_4$NPF$_6$ example. FIG. 9 shows that n-dopability of the active material (the reversible positive and negative current peaks around −2.0 V) is significant and reversible in both electrolytes, although the TMATFMS shows a relatively enhanced degree of reversible n-dopability. Bu$_4$NPF$_6$ is a commonly used, commercially available tetraalkylammonium salt.

FIG. 10 is a voltammogram obtained with 1.0 mol/dm$^3$ of tetraethylammonium tetrafluoroborate (Et$_4$NBF$_4$) in acetonotrile and an electrode having a film of PFPT. The PFPT film was grown at 1 mA/cm$^2$ for 150 sec. on carbon paper, as above, from an acetonitrile solution of 0.1 mol/dm$^3$ in the monomer FPT and 1.0 mol/dm$^3$ in Et$_4$NBF$_4$. Again, the degree of n-doping is substantial and reversible with positive and negative current peaks around −2 V. This electrolyte solution has a slightly lower ratio of n-doping charge to p-doping charge than an electrolyte formed with TMATFMS.

Thus, a new class of supercapacitors is described herein where each electrode is formed of a conducting polymer that can be both p-doped and n-doped. The capability to both n- and p-dope enables a larger voltage between the charged plates, and, since the stored energy scales as V$^2$, the improvement from the increased voltage is readily apparent. The configuration can be symmetric, i.e., both of the electrodes formed of the same material, or unsymmetric, i.e., each electrode is formed of a separate n- and p-dopable material. A preferred conducting polymer for a symmetric configuration is a polymer where the backbone is polythiophene. In addition, a new electrolyte, TMATFMS, has been demonstrated where the electrolyte is soluble in a conventional solvent, acetonitrile, and has a small cation that can travel rapidly through the polymer for charging/discharging the capacitor and permit a rapid delivery of the stored energy to a load.

Figure 11:
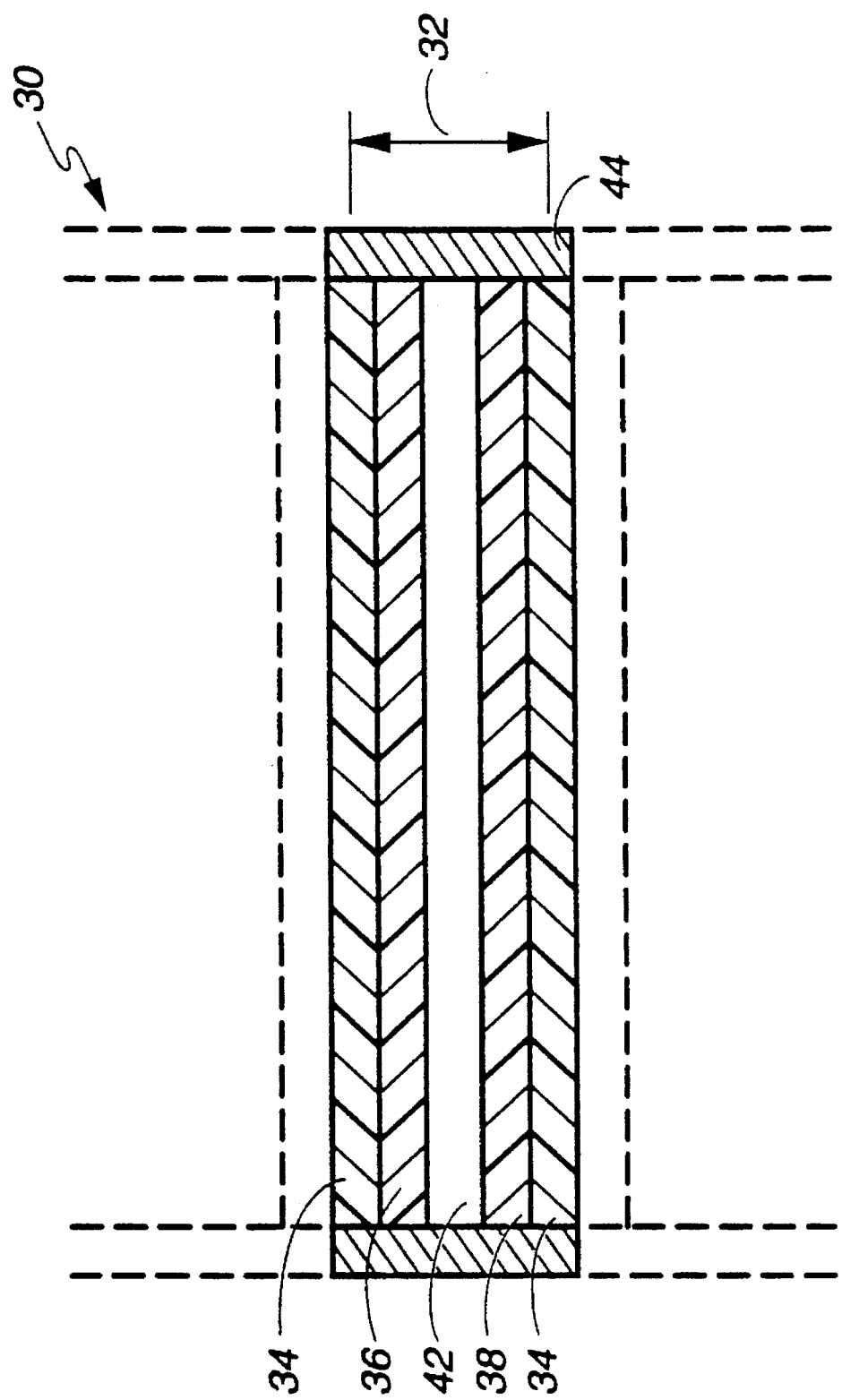
FIG. 11 is a cross-section of an exemplary capacitor according to one embodiment of the present invention.

FIG. 11 illustrates in cross-section an exemplary capacitor 30 formed according to the present invention. Capacitor 30 may be comprised of a plurality of individual cells 32. Each cell 32 includes bipolar current collector plates 34 where one plate contacts a p-doped conducting polymer 36 and the other plate contacts an n-doped conducting polymer 38. It will be understood that each bipolar plate 34 contacts an n-doped conducting polymer on one side of the plate and a p-doped conducting polymer on the other side of the plate when a plurality of cells 32 are provided. P-doped conducting polymer 36 and n-doped conducting polymer 38 are separated by an electrolyte that permits rapid ion transport within the polymers during polymer charging and discharging. As noted above, the preferred form of polymer is a conducting polymer having a backbone of polythiophene and preferred form of electrolyte is TMATFMS.

The foregoing description of embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrochemical capacitor comprising:
   a first electrode of a p-dopable conducting polymer having a polythiophene backbone;
   a second electrode of a n-dopable conducting polymer having a polythiophene backbone; and an electrolyte separating said first and second electrodes, said electrolyte comprising a salt of tetraalkylammonium that is highly soluble in acetonitrile and is stable over a wide voltage difference, said alkyl being selected from the group consisting of methyl, ethyl, propyl, or butyl; wherein said first electrode is fully p-doped and said second electrode is fully n-doped when said capacitor is fully charged and said first and second electrodes are fully undoped when said capacitor is fully discharged.

2. An electrochemical capacitor according to claim 1, wherein said p-dopable conducting polymer and said n-dopable conducting polymer are formed from the same conducting polymer.

3. An electrochemical capacitor having conducting polymer electrodes and an electrolyte solution, where the improvement is a first electrode of a p-dopable conducting polymer and a second electrode of a n-dopable conducting polymer, where each said conducting polymer is selected from the group consisting of polymers of thiophene derivatized in the 3-position, having an aryl group attached to thiophene in the 3-position, polymers having aryl and alkyl groups independently attached to thiophene in the 3 and 4 positions, and polymers synthesized from bridged dimers having polythiophene as the backbone;
   wherein said first electrode is fully p-doped and said second electrode is fully n-doped when said capacitor is fully charged and said first and second electrodes are fully undoped when said capacitor is fully discharged.

4. An electrochemical capacitor according to claim 3, where said electrolyte is a solution of a salt of tetraalkylammonium dissolved in acetonitrile, said salt being highly soluble in acetonitrile and stable over a wide voltage range, said alkyl being selected from the group consisting of methyl, ethyl, propyl, or butyl.

5. An electrochemical capacitor according to claim 3, where said polymer is poly-3-(4-fluorophenyl)-thiophene.

6. An electrochemical capacitor according to claim 5, where said electrolyte is a solution of a salt of tetraalkylammonium dissolved in acetonitrile, said salt being highly soluble in acetonitrile and stable over a wide voltage range, said alkyl being selected from the group consisting of methyl, ethyl, propyl, or butyl.

7. An electrochemical capacitor according to claim 1, wherein said tetryalkylammonium salt is selected from the group of salts consisting of trifluoromethanesulphonate, hexafluorophosphate, tetrafluoroborate, nitrate and perchlorate.

8. An electrochemical capacitor according to claim 4, wherein said tetryalkylammonium salt is selected from the group of salts consisting of trifluoromethanesulphonate, hexafluorophosphate, tetrafluoroborate, nitrate and perchlorate.

9. An electrochemical capacitor according to claim 6, wherein said tetryalkylammonium salt is selected from the group of salts consisting of trifluoromethanesulphonate, hexafluorophosphate, tetrafluoroborate, nitrate and perchlorate.

\* \* \* \* \*